(12) United States Patent
Hindy et al.

(10) Patent No.: US 12,634,060 B2
(45) Date of Patent: May 19, 2026

(54) CONFIGURING A CHANNEL STATE INFORMATION REPORT

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 18/548,156

(22) PCT Filed: Feb. 17, 2022

(86) PCT No.: PCT/IB2022/051440
§ 371 (c)(1),
(2) Date: Aug. 28, 2023

(87) PCT Pub. No.: WO2022/180490
PCT Pub. Date: Sep. 1, 2022

(65) Prior Publication Data
US 2024/0137167 A1    Apr. 25, 2024
US 2024/0235751 A9    Jul. 11, 2024

Related U.S. Application Data

(60) Provisional application No. 63/154,575, filed on Feb. 26, 2021.

(51) Int. Cl.
*H04L 5/00*      (2006.01)
*H04B 7/06*      (2006.01)
*H04W 72/232*    (2023.01)

(52) U.S. Cl.
CPC ......... *H04L 5/0035* (2013.01); *H04B 7/0626* (2013.01); *H04L 5/0044* (2013.01); *H04L 5/0057* (2013.01); *H04W 72/232* (2023.01)

(58) Field of Classification Search
CPC ... H04B 7/0626; H04L 5/0035; H04L 5/0044; H04L 5/0057; H04L 5/0091; H04W 72/232
(Continued)

(56) References Cited

U.S. PATENT DOCUMENTS 12,082,201 B2 *  9/2024  Yi ......................... H04W 72/23
12,376,132 B2 *  7/2025  Liu ......................... H04W 4/06
(Continued)

FOREIGN PATENT DOCUMENTS

CN       116325877 A  *  6/2023  ............ H04W 24/08
EP        3809620 A1      4/2021
WO    2020017918 A1      1/2020

OTHER PUBLICATIONS

PCT/IB2022/051440, "International Search Report and the Written Opinion of the International Searching Authority, or the Declaration", International Searching Authority, May 30, 2022, pp. 1-14.
(Continued)

*Primary Examiner* — Rownak Islam
(74) *Attorney, Agent, or Firm* — Kunzler Needham Hilton

(57) ABSTRACT

Apparatuses, methods, and systems are disclosed for configuring a channel state information report. One method includes receiving, at a user equipment, two downlink control information (DCI) sequences over a physical downlink control channel (PDCCH). Information for a first PDSCH of the at least one PDSCH corresponding to a first DCI sequence of the two DCI sequences is inferred from DCI fields corresponding to a second DCI sequence of the two DCI sequences. The method includes receiving at least one channel state information (CSI) reporting configuration. The method includes receiving a CSI reference signal transmitted from the two network nodes based on the at least one CSI reporting configuration. The method includes transmit-
(Continued)

ting a CSI report based on the least one CSI reporting configuration and the CSI reference signal.

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0243767 A1* | 8/2021 | Suzuki | .................. | H04L 5/0007 |
| 2021/0266944 A1* | 8/2021 | Noh | ...................... | H04W 72/23 |
| 2021/0328742 A1* | 10/2021 | Hao | ...................... | H04L 5/0057 |
| 2022/0399983 A1* | 12/2022 | Muruganathan | ...... | H04L 5/0053 |
| 2023/0189037 A1* | 6/2023 | Matsumura | ........... | H04L 5/0035 |
| | | | | 370/252 |

OTHER PUBLICATIONS

Samsung et al., "WF on Type I and II CSI codebooks", 3GPP TSG-RAN WG1 #89 R1-1709232, May 15-19, 2017, pp. 1-24.
Huawei et al., "CSI measurement enhancement for multi-TRP/panel transmission", 3GPP TSG RAN WG1 Meeting #97 R1-1906038, May 13-17, 2019, pp. 1-4.

LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.
Vivo, "Further discussion and evaluation on MTRP CSI and partial reciprocity", 3GPP TSG RAN WG1 #104-e R1-2007650, Jan. 25-Feb. 5, 2021, pp. 1-28.
Intel Corp., "On CSI enhancements for MTRP and FDD", 3GPP TSG RAN WG1 104-e R1-2100642, Jan. 25- Feb. 5, 2021, pp. 1-12.
Lenovo et al., "CSI enhancements for mTRP and FDD reciprocity", 3GPP TSG RAN WG1 #104-e R1-2100989, Jan. 25-Feb. 5, 2021, pp. 1-13.
3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.
3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

200

300

400

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex           OPTIONAL,    -- Need S
    resourcesForChannelMeasurement      CSI-ResourceConfigId,
    csi-IM-ResourcesForInterference     CSI-ResourceConfigId    OPTIONAL,    -- Need R
    nzp-CSI-RS-ResourcesForInterference CSI-ResourceConfigId    OPTIONAL,    -- Need R reportConfigType                    CHOICE {
        periodic                        SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUCCH           SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUSCH           SEQUENCE {
            reportSlotConfig            ENUMERATED {sl5, sl10, sl20, sl40, sl80, sl160, sl320},
            reportSlotOffsetList        SEQUENCE (SIZE (1.. maxNrofUL-Allocations)) OF INTEGER(0..32),
            p0alpha                             P0-PUSCH-AlphaSetId
        },
        aperiodic                       SEQUENCE {
            reportSlotOffsetList        SEQUENCE (SIZE (1..maxNrofUL-Allocations)) OF INTEGER(0..32)
        }
    },
    mTRPCSIEnabled                      ENUMERATED {TRUE}       OPTIONAL,    -- Need R

[......................]

-- TAG-CSI-REPORTCONFIG-STOP
-- ASN1STOP
```

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex            OPTIONAL,    -- Need S
    resourcesForChannelMeasurement      CSI-ResourceConfigId,
    csi-IM-ResourcesForInterference     CSI-ResourceConfigId     OPTIONAL,    -- Need R
    nzp-CSI-RS-ResourcesForInterference CSI-ResourceConfigId     OPTIONAL,    -- Need R reportConfigType                    CHOICE {
        periodic                        SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUCCH           SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUSCH           SEQUENCE {
            reportSlotConfig            ENUMERATED {s15, s110, s120, s140, s180, s1160, s1320},
            reportSlotOffsetList        SEQUENCE (SIZE (1.. maxNrofUL-Allocations)) OF INTEGER(0..32),
            p0alpha                     P0-PUSCH-AlphaSetId
        },
        aperiodic                       SEQUENCE {
            reportSlotOffsetList        SEQUENCE (SIZE (1..maxNrofUL-Allocations)) OF INTEGER(0..32)
        }
    },
    numberOfReports                     ENUMERATED {1,2,3,4}     OPTIONAL,    -- Need R

[...........................]

-- TAG-CSI-REPORTCONFIG-STOP
-- ASN1STOP
```

Figure 6:
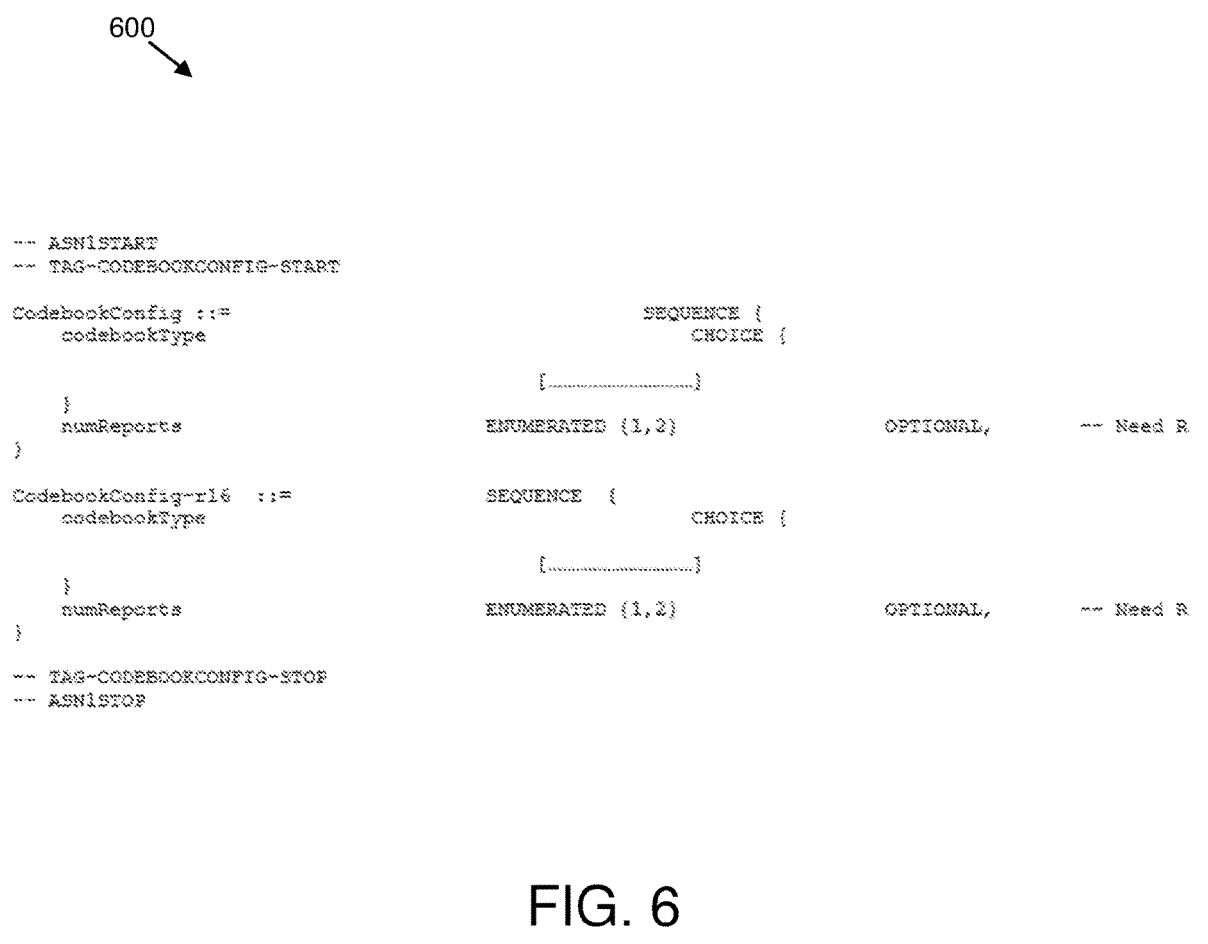

```
-- ASN1START
-- TAG-CODEBOOKCONFIG-START

CodebookConfig ::=                              SEQUENCE {
    codebookType                                    CHOICE {

[......................]
    }
    numReports                      ENUMERATED {1,2}            OPTIONAL,        -- Need R
}

CodebookConfig-r16 ::=              SEQUENCE {
    codebookType                                    CHOICE {

[......................]
    }
    numReports                      ENUMERATED {1,2}            OPTIONAL,        -- Need R
}

-- TAG-CODEBOOKCONFIG-STOP
-- ASN1STOP
```

```
-- ASN1START
-- TAG-CSI-REPORTCONFIG-START

CSI-ReportConfig ::=                    SEQUENCE {
    reportConfigId                          CSI-ReportConfigId,
    carrier                                 ServCellIndex              OPTIONAL,    -- Need S
    resourcesForChannelMeasurement          CSI-ResourceConfigId,
    csi-IM-ResourcesForInterference         CSI-ResourceConfigId       OPTIONAL,    -- Need R
    nzp-CSI-RS-ResourcesForInterference     CSI-ResourceConfigId       OPTIONAL,    -- Need R

[...........................]

timeRestrictionForChannelMeasurements   ENUMERATED {configured, notConfigured},
    timeRestrictionForInterferenceMeasurements ENUMERATED {configured, notConfigured},
    codebookConfig                          CodebookConfig             OPTIONAL,    -- Need R
    codebookConfig2                         CodebookConfig             OPTIONAL,    -- Need R
    dummy                                   ENUMERATED {n1, n2}        OPTIONAL,    -- Need R

[...........................]

reportQuantity-r16                      CHOICE {
        cri-SINR-r16                            NULL,
        ssb-Index-SINR-r16                      NULL
    }                                                                  OPTIONAL,    -- Need R
    codebookConfig-r16                      CodebookConfig-r16         OPTIONAL     -- Need R
    codebookConfig2-r17                     CodebookConfig-r17         OPTIONAL     -- Need R
    }}
}

[...........................]

-- TAG-CSI-REPORTCONFIG-STOP
-- ASN1STOP
```

FIG. 7

800

```
-- ASN1START
-- TAG-CSI-REPORTCONFIG-START

CSI-ReportConfig ::=                    SEQUENCE {
    reportConfigId                          CSI-ReportConfigId,
    carrier                                 ServCellIndex           OPTIONAL,    -- Need S
    resourcesForChannelMeasurement          CSI-ResourceConfigId,
    csi-IM-ResourcesForInterference         CSI-ResourceConfigId    OPTIONAL,    -- Need R
    nzp-CSI-RS-ResourcesForInterference     CSI-ResourceConfigId    OPTIONAL,    -- Need R

[.................]

reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}    OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL
    },
    reportQuantity1                         CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}    OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL
    },                                                          OPTIONAL,    -- Need R

}

[.................]

-- TAG-CSI-REPORTCONFIG-STOP
-- ASN1STOP
```

FIG. 8

900

```
-- ASN1START
-- TAG-REPETITIONSCHEMECONFIG-START

RepetitionSchemeConfig-r17 ::= CHOICE {
    fdm-TDM-r17                     SetupRelease { FDM-TDM-r17 },
    slotBased-r17                   SetupRelease { SlotBased-r17 }
}

RepetitionSchemeConfig-v1730 ::=   SEQUENCE {
    slotBased-v1730                 SetupRelease { SlotBased-v1730 }
}

FDM-TDM-r17 ::=                 SEQUENCE {
    repetitionScheme-r17           ENUMERATED {fdmSchemeA, fdmSchemeB, tdmSchemeA, sdmSchemeA },
    startingSymbolOffsetK-r17      INTEGER (0..7)                                OPTIONAL --
Need R
}

SlotBased-r17 ::=              SEQUENCE {
    tciMapping-r17                 ENUMERATED {cyclicMapping, sequentialMapping},
    sequenceOffsetForRV-r17        INTEGER (1..3)
}

SlotBased-v1730 ::=           SEQUENCE {
    tciMapping-r17                 ENUMERATED {cyclicMapping, sequentialMapping},
    sequenceOffsetForRV-r17        INTEGER (0)
}

-- TAG-REPETITIONSCHEMECONFIG-STOP
-- ASN1STOP
```

FIG. 9

1000

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex                   OPTIONAL,   -- Need S
    resourcesForChannelMeasurement      CSI-ResourceConfigId,
    csi-IM-ResourcesForInterference     CSI-ResourceConfigId            OPTIONAL,   -- Need R
    ncp-CSI-RS-ResourcesForInterference CSI-ResourceConfigId            OPTIONAL,   -- Need R

[................]

reportFreqConfiguration             SEQUENCE {
        cqi-FormatIndicator             ENUMERATED { widebandCQI, subbandCQI }   OPTIONAL,   -- Need R
        cqi-FormatIndicator1            ENUMERATED { widebandCQI, subbandCQI }   OPTIONAL,   -- Need R
        pmi-FormatIndicator             ENUMERATED { widebandPMI, subbandPMI }   OPTIONAL,   -- Need R
        csi-ReportingBand               CHOICE {
            subbands3                       BIT STRING(SIZE(3)),
            subbands4                       BIT STRING(SIZE(4)),
            subbands5                       BIT STRING(SIZE(5)),
            subbands6                       BIT STRING(SIZE(6)),
            subbands7                       BIT STRING(SIZE(7)),
            subbands8                       BIT STRING(SIZE(8)),
            subbands9                       BIT STRING(SIZE(9)),
            subbands10                      BIT STRING(SIZE(10)),
            subbands11                      BIT STRING(SIZE(11)),
            subbands12                      BIT STRING(SIZE(12)),
            subbands13                      BIT STRING(SIZE(13)),
            subbands14                      BIT STRING(SIZE(14)),
            subbands15                      BIT STRING(SIZE(15)),
            subbands16                      BIT STRING(SIZE(16)),
            subbands17                      BIT STRING(SIZE(17)),
            subbands18                      BIT STRING(SIZE(18)),
            ...,
            subbands19-v1530                BIT STRING(SIZE(19))
        } OPTIONAL,    -- Need S }                                                                   OPTIONAL,   -- Need R

[................]

-- TAG-CSI-REPORTCONFIG-STOP
-- ASN1STOP
```

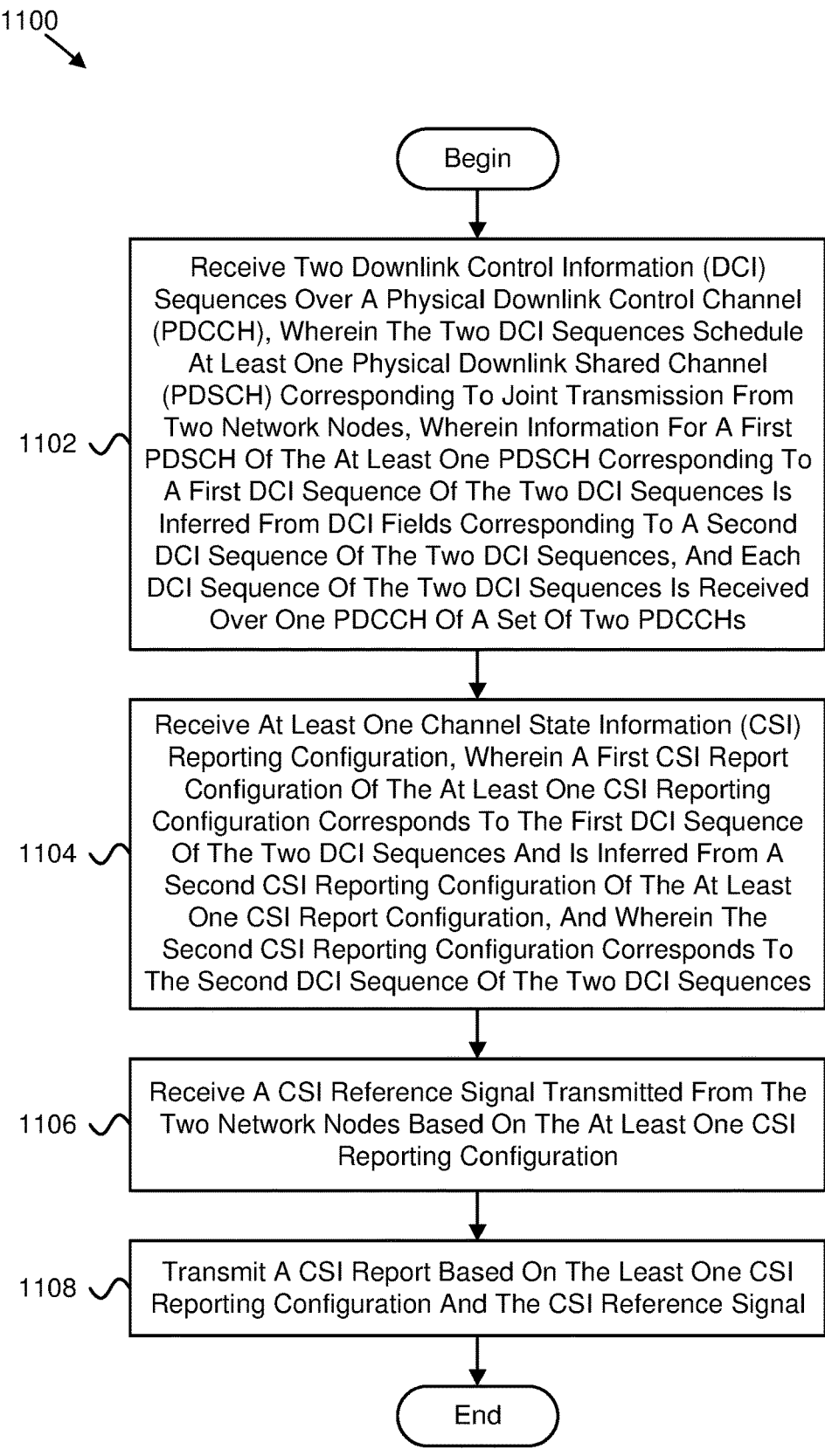

Begin

1102

Receive Two Downlink Control Information (DCI) Sequences Over A Physical Downlink Control Channel (PDCCH), Wherein The Two DCI Sequences Schedule At Least One Physical Downlink Shared Channel (PDSCH) Corresponding To Joint Transmission From Two Network Nodes, Wherein Information For A First PDSCH Of The At Least One PDSCH Corresponding To A First DCI Sequence Of The Two DCI Sequences Is Inferred From DCI Fields Corresponding To A Second DCI Sequence Of The Two DCI Sequences, And Each DCI Sequence Of The Two DCI Sequences Is Received Over One PDCCH Of A Set Of Two PDCCHs

1104

Receive At Least One Channel State Information (CSI) Reporting Configuration, Wherein A First CSI Report Configuration Of The At Least One CSI Reporting Configuration Corresponds To The First DCI Sequence Of The Two DCI Sequences And Is Inferred From A Second CSI Reporting Configuration Of The At Least One CSI Report Configuration, And Wherein The Second CSI Reporting Configuration Corresponds To The Second DCI Sequence Of The Two DCI Sequences

1106

Receive A CSI Reference Signal Transmitted From The Two Network Nodes Based On The At Least One CSI Reporting Configuration

1108

Transmit A CSI Report Based On The Least One CSI Reporting Configuration And The CSI Reference Signal End

FIG. 11

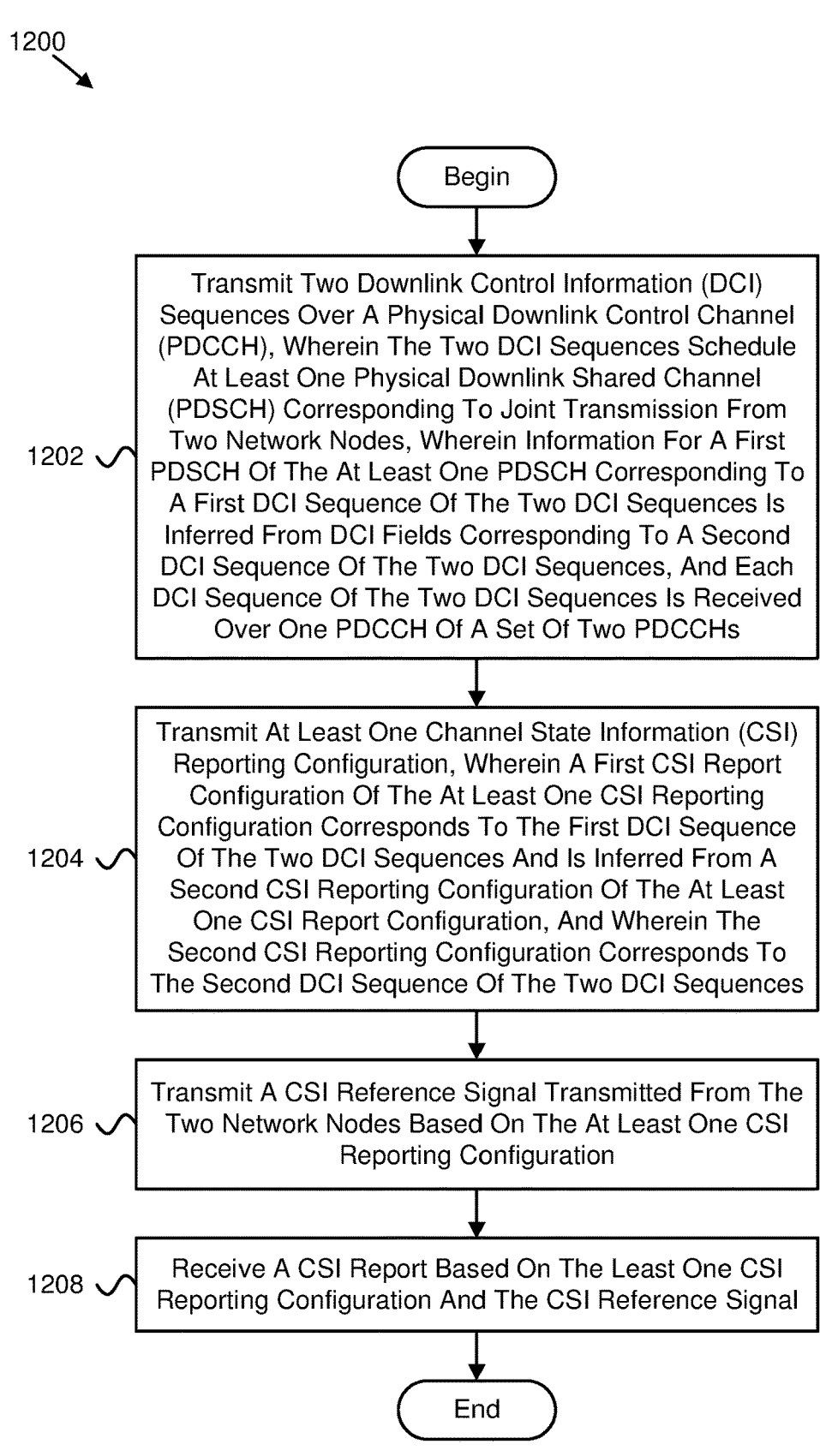

1200

Begin

1202 Transmit Two Downlink Control Information (DCI) Sequences Over A Physical Downlink Control Channel (PDCCH), Wherein The Two DCI Sequences Schedule At Least One Physical Downlink Shared Channel (PDSCH) Corresponding To Joint Transmission From Two Network Nodes, Wherein Information For A First PDSCH Of The At Least One PDSCH Corresponding To A First DCI Sequence Of The Two DCI Sequences Is Inferred From DCI Fields Corresponding To A Second DCI Sequence Of The Two DCI Sequences, And Each DCI Sequence Of The Two DCI Sequences Is Received Over One PDCCH Of A Set Of Two PDCCHs 1204 Transmit At Least One Channel State Information (CSI) Reporting Configuration, Wherein A First CSI Report Configuration Of The At Least One CSI Reporting Configuration Corresponds To The First DCI Sequence Of The Two DCI Sequences And Is Inferred From A Second CSI Reporting Configuration Of The At Least One CSI Report Configuration, And Wherein The Second CSI Reporting Configuration Corresponds To The Second DCI Sequence Of The Two DCI Sequences 1206 Transmit A CSI Reference Signal Transmitted From The Two Network Nodes Based On The At Least One CSI Reporting Configuration 1208 Receive A CSI Report Based On The Least One CSI Reporting Configuration And The CSI Reference Signal End

FIG. 12

CONFIGURING A CHANNEL STATE INFORMATION REPORT

CROSS-REFERENCE TO RELATED APPLICATIONS

This application claims priority to U.S. Patent Application Ser. No. 63/154,575 entitled "APPARATUSES, METHODS, AND SYSTEMS FOR CSI ENHANCEMENTS FOR MULTI-TRP UNDER MULTI-DCI SCENARIOS" and filed on Feb. 26, 2021 for Ahmed Monier Ibrahim Saleh Hindy, which is incorporated herein by reference in its entirety.

FIELD

The subject matter disclosed herein relates generally to wireless communications and more particularly relates to configuring a channel state information report.

BACKGROUND

In certain wireless communications networks, channel state information reports may be made. In such networks, devices moving at high speeds may be used.

BRIEF SUMMARY

Methods for configuring a channel state information report are disclosed. Apparatuses and systems also perform the functions of the methods. One embodiment of a method includes receiving, at a user equipment, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the method includes receiving at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the method includes receiving a CSI reference signal transmitted from the two network nodes based on the at least one CSI reporting configuration. In various embodiments, the method includes transmitting a CSI report based on the least one CSI reporting configuration and the CSI reference signal.

One apparatus for configuring a channel state information report includes a user equipment. In some embodiments, the apparatus includes a receiver that: receives two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; receives at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and receives a CSI reference signal transmitted from the two network nodes based on the at least one CSI reporting configuration. In various embodiments, the apparatus includes a transmitter that transmits a CSI report based on the least one CSI reporting configuration and the CSI reference signal.

Another embodiment of a method for configuring a channel state information report includes transmitting, from at least one network unit, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the method includes transmitting at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the method includes transmitting a CSI reference signal transmitted from the two network nodes based on the at least one CSI reporting configuration. In various embodiments, the method includes receiving a CSI report based on the least one CSI reporting configuration and the CSI reference signal.

Another apparatus for configuring a channel state information report includes at least one network unit. In some embodiments, the apparatus includes a transmitter that: transmits two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; transmits at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and transmits a CSI reference signal transmitted from the two network nodes based on the at least one CSI reporting configuration. In various embodiments, the apparatus includes a receiver that receives a CSI report based on the least one CSI reporting configuration and the CSI reference signal.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of ASN.1 code for CSI-ReportConfig reporting setting IE with a multi-TRP transmission indication according to a second embodiment of a first set of embodiments;

FIG. 5 is a schematic block diagram illustrating one embodiment of ASN.1 code for triggering more than one CSI report within a CSI-ReportConfig reporting setting IE according to a third embodiment of a first set of embodiments;

FIG. 6 is a schematic block diagram illustrating one embodiment of ASN.1 code for triggering two CSI reports within a CodebookConfig codebook configuration IE according to a third embodiment of a first set of embodiments;

FIG. 7 is a schematic block diagram illustrating one embodiment of ASN.1 code for triggering two CSI reports within a CSI-ReportConfig reporting setting IE according to a fourth embodiment of a first set of embodiments;

FIG. 8 is a schematic block diagram illustrating one embodiment of ASN.1 code for triggering two CSI reports within a CSI-ReportConfig reporting setting IE according to a fifth embodiment of a first set of embodiments;

FIG. 9 is a schematic block diagram illustrating one embodiment of ASN.1 code for a RepetitionSchemeConfig repetition scheme configuration IE according to a sixth embodiment of a first set of embodiments;

FIG. 10 is a schematic block diagram illustrating one embodiment of ASN.1 code for triggering multiple CQI values within a CSI-ReportConfig reporting setting IE according to a sixth embodiment of a sixth set of embodiments;

FIG. 11 is a flow chart diagram illustrating one embodiment of a method for configuring a channel state information report; and FIG. 12 is a flow chart diagram illustrating another embodiment of a method for configuring a channel state information report.

DETAILED DESCRIPTION

Figure 1:
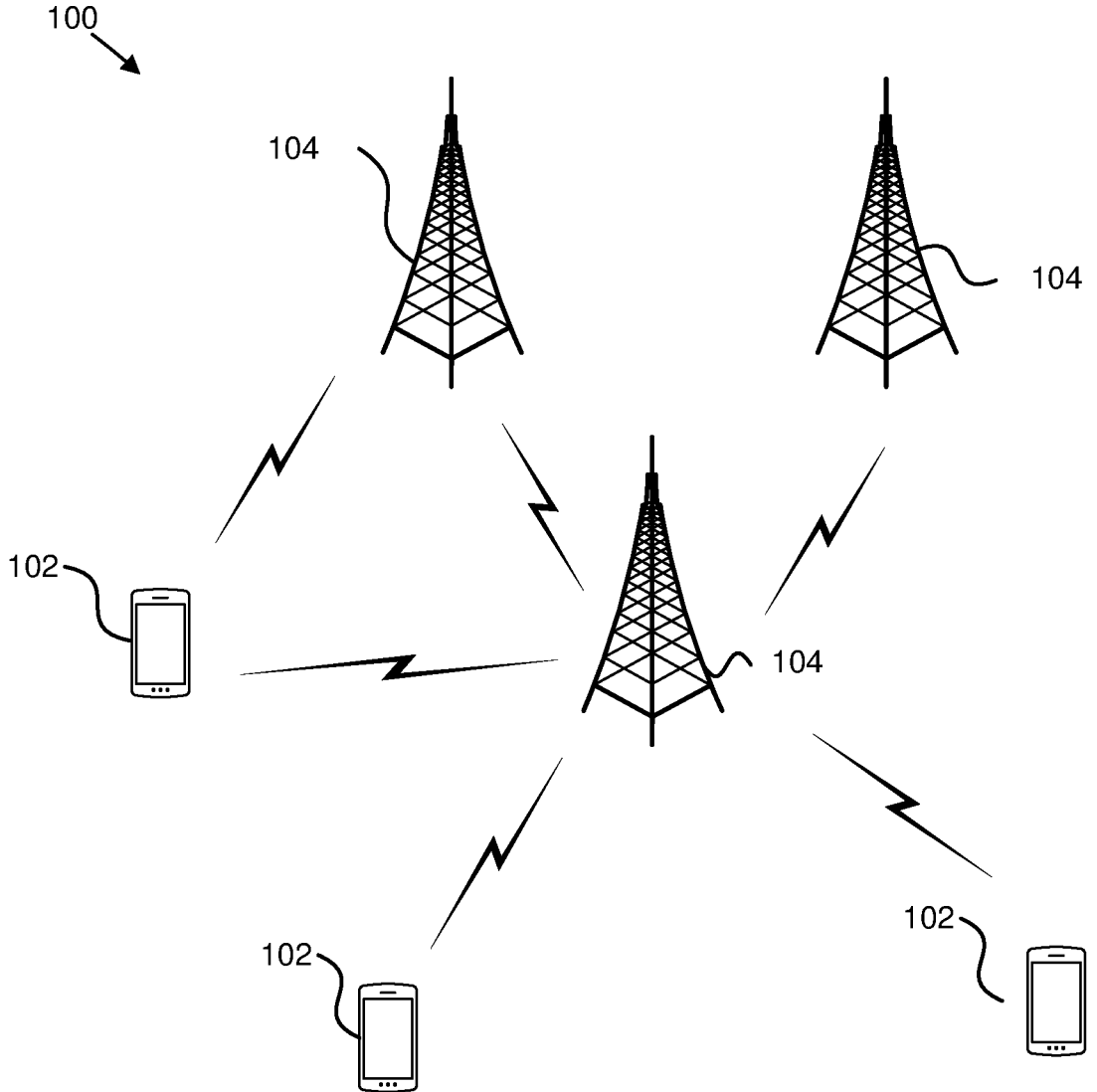
FIG. 1 is a schematic block diagram illustrating one embodiment of a wireless communication system for configuring a channel state information report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a channel state information report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units

104 transmit DL communication signals to serve the remote units 102 in the time, frequency, and/or spatial domain.

In various embodiments, a remote unit 102 may receive, at a user equipment, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the remote unit 102 may receive at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the remote unit 102 may receive a CSI reference signal transmitted from the two network nodes based on the at least one CSI reporting configuration. In various embodiments, the remote unit 102 may transmit a CSI report based on the least one CSI reporting configuration and the CSI reference signal. Accordingly, the remote unit 102 may be used for configuring a channel state information report.

In certain embodiments, a network unit 104 may transmit, from at least one network unit, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the network unit 104 may transmit at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the network unit 104 may transmit a CSI reference signal transmitted from the two network nodes based on the at least one CSI reporting configuration. In various embodiments, the network unit 104 may receive a CSI report based on the least one CSI reporting configuration and the CSI reference signal. Accordingly, the network unit 104 may be used for configuring a channel state information report.

Figure 2:
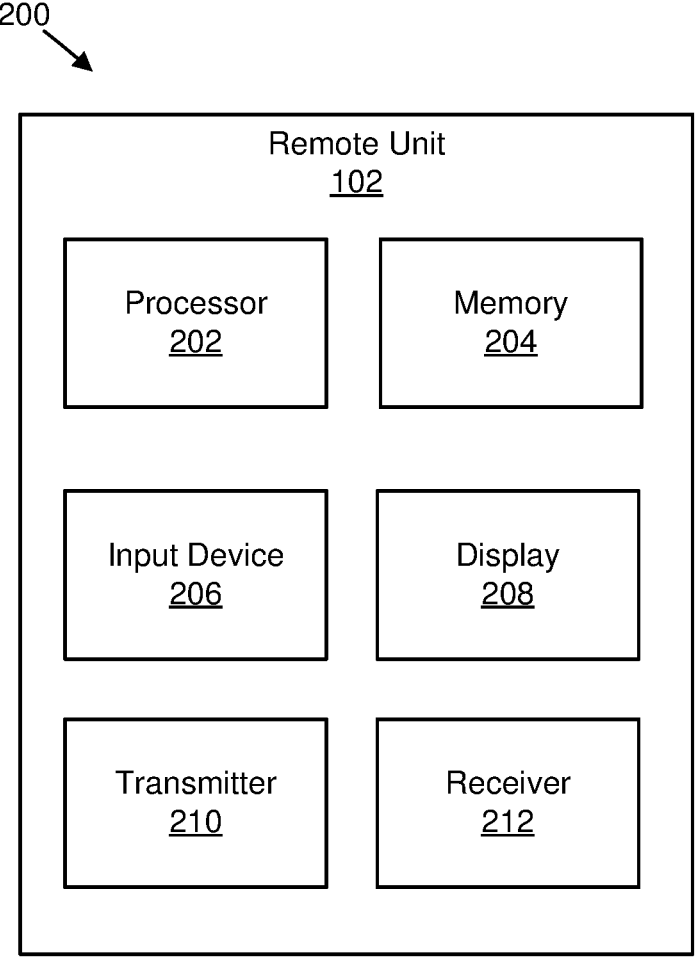
FIG. 2 is a schematic block diagram illustrating one embodiment of an apparatus that may be used for configuring a channel state information report.

FIG. 2 depicts one embodiment of an apparatus 200 that may be used for configuring a channel state information report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; receives at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and receives a CSI reference signal transmitted from the two network nodes based on the at least one CSI reporting configuration. In various embodiments, the transmitter 210 transmits a CSI report based on the least one CSI reporting configuration and the CSI reference signal.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
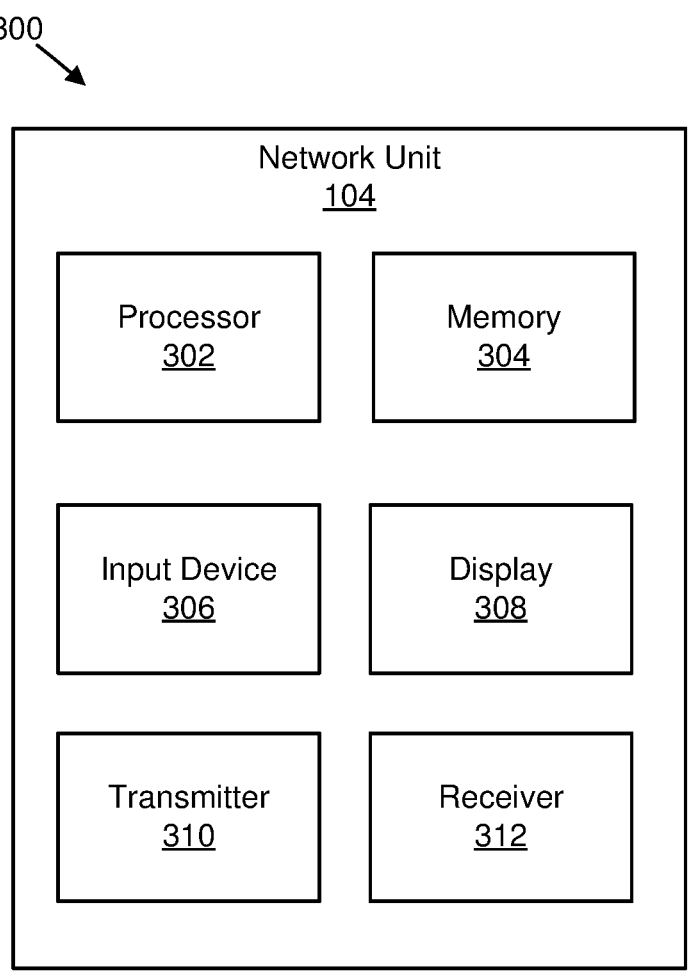
FIG. 3 is a schematic block diagram illustrating one embodiment of an apparatus that may be used for configuring a channel state information report.

FIG. 3 depicts one embodiment of an apparatus 300 that may be used for configuring a channel state information report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; transmits at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and transmits a CSI reference signal transmitted from the two network nodes based on the at least one CSI reporting configuration. In various embodiments, the receiver 312 receives a CSI report based on the least one CSI reporting configuration and the CSI reference signal.

In certain embodiments, such as for 3GPP new radio ("NR"), multiple transmission and reception points ("TRPs") or multi-antenna panels within a TRP may communicate simultaneously with one UE to enhance coverage, throughput, and/or reliability. This may come at the expense of excessive control signaling between a network side and a user equipment ("UE") side, so as to communicate the best transmission configuration (e.g., whether to support multi-point transmission), and if so, which TRPs would operate simultaneously, in addition to a possibly super-linear increase in the amount of channel state information ("CSI") feedback reported from the UE to the network, since a distinct report may be needed for each transmission configuration. In some embodiments, for Type-II codebook with high resolution, a number of precoder matrix indicator ("PMI") bits fed back from the UE in a gNB via uplink control information ("UCI") may be very large (e.g., >1000 bits at large bandwidth), even for a single-point transmission. Thereby, reducing the number of PMI feedback bits per report may be important to improve efficiency. In various embodiments, multiple-input multiple-output ("MIMO") may include multi-TRP and multi-panel transmissions. The purpose of multi-TRP transmission may be to improve a spectral efficiency as well as a reliability and robustness of a connection in different scenarios, and may cover both ideal and nonideal backhaul. For increasing the reliability using multi-TRP, ultra-reliable low-latency communication ("URLLC") under multi-TRP transmission may be used, where the UE may be served by multiple TRPs forming a coordination cluster, possibly connected to a central processing unit.

In some embodiments, a UE may be dynamically scheduled to be served by one of multiple TRPs in a cluster. A network may also pick two TRPs to perform joint transmission. In either case, the UE may need to report needed CSI information for the network for it to decide the multi-TRP downlink transmission scheme.

In various embodiments, a number of transmission hypotheses increases exponentially with a number of TRPs in a coordination cluster. For example, for 4 TRPs, there may be 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting may increase dramatically with the size of the coordination cluster. For example, the presence of K TRPs may trigger up to $$K + \binom{K}{n}, \text{ where } \binom{K}{n}$$

represents the binomial coefficient representing the number of possible unordered n-tuples selected from a set of K elements, where $n \leq K$.

In certain embodiments, UL transmission resources on which CSI reports are transmitted may not be enough, and partial CSI omission may be necessary. In some embodiments, CSI reports may be prioritized according to: 1) time-domain behavior and physical channel, where more dynamic reports are given precedence over less dynamic reports and a physical uplink shared channel ("PUSCH") may have precedence over a physical uplink control channel ("PUCCH"); 2) CSI content, where beam reports (e.g., layer 1 ("L1") reference signal received power ("RSRP") ("L1-RSRP") reporting) may have priority over regular CSI reports; 3) the serving cell to which the CSI corresponds (e.g., for carrier aggregation ("CA") operation)—CSI corresponding to a primary cell ("PCell") having priority over CSI corresponding to secondary cells ("SCells"); and/or 4) a CSI report setting identifier ("ID") (e.g., reportConfigID).

In some embodiments, multi-TRP transmission with multiple downlink control information ("DCI") ("multi-DCI") may facilitate: 1) providing a proper indication to a UE to trigger CSI reporting and/or multi-TRP reporting under multi-DCI; 2) enhancing DCI signaling (e.g., in terms of DCI format and other DCI design details) to ensure concise and/or robust downlink ("DL") signaling for multi-TRP transmission under multi-DCI; and/or 3) providing efficient CSI configuration and reporting for multi-DCI multi-TRP transmission.

It should be noted that one or more elements or features from one or more embodiments may be combined (e.g., for CSI measurement, feedback generation, and/or reporting) which may reduce the overall CSI feedback overhead.

In various embodiments: 1) the term "TRP" may refer to TRPs, cells, nodes, panels, communication (e.g., signals and/or channels) associated with a control resource set ("CORESET") pool, and/or communication associated with a TCI state from a transmission configuration including at least two TCI states; 2) a codebook type may be arbitrary—there may be a flexibility for using different codebook types (e.g., Type-I and Type-II codebooks); and/or 3) a UE may be triggered with two or more DCI, wherein a multi-TRP scheme may be based on spatial division multiplexing ("SDM") (e.g., scheme 1a), frequency division multiplexing ("FDM") (e.g., schemes 2a and/or 2b), and time division multiplexing ("TDM") (e.g., schemes 3 and/or 4). Other transmission schemes are not precluded.

In certain embodiments, there may be a CSI reporting configuration and feedback for multi-TRP. In such embodiments, a UE is configured by higher layers with one or more CSI-ReportConfig reporting settings for CSI reporting, one or more CSI-ResourceConfig resource settings for CSI measurement, and one or two lists of trigger states (e.g., given by the higher layer parameters CSI-AperiodicTriggerStateList and CSI-SemiPersistentOnPUSCH-TriggerStateList). Each trigger state in a CSI-AperiodicTriggerStateList may contain a list of a subset of associated CSI-ReportConfigs indicating resource set IDs for channel and optionally for interference. Each trigger state in a CSI-SemiPersistentOnPUSCH-TriggerStateList may contain one or more associated CSI-ReportConfig.

In a first set of embodiments, there may be an indication of multi-TRP transmission. Different embodiments for indication of multi-TRP transmission are found herein. Embodiments with a combination of one or more of the embodiments herein is not precluded.

In a first embodiment of the first set of embodiments, a UE configured with multi-TRP transmission may receive two PDCCHs, wherein CORESETs (e.g., ControlResourceSets) corresponding to the two PDCCHs may have different values of a CORESET pool index (e.g., CORESETPoolIndex). Each PDCCH may schedule a physical downlink shared channel ("PDSCH"), or both PDCCHs may schedule one PDSCH.

In a second embodiment of the first set of embodiments, a UE configured with multi-TRP transmission may be configured with one or more CSI reporting settings CSI-ReportConfig, wherein at least one of the one or more CSI reporting settings CSI-ReportConfig includes a higher-layer parameter (e.g., mTRP-CSI-Enabled). FIG. 4 is a schematic block diagram illustrating one embodiment of abstract syntax notation 1 ("ASN.1") code 400 for a CSI-ReportConfig reporting setting information element ("IE") with a multi-TRP transmission indication according to the second embodiment of the first set of embodiments.

In a third embodiment of the first set of embodiments, a UE configured with multi-TRP transmission may be configured with one or more CSI reporting settings CSI-ReportConfig, wherein at least one of the one or more CSI reporting settings CSI-ReportConfig includes a higher-layer parameter which triggers the UE to report a given number of CSI reports (e.g., numberOfReports) in the CSI-ReportConfig reporting setting or any of its elements (e.g., codebookConfig). FIG. 5 is a schematic block diagram illustrating one embodiment of ASN.1 code 500 for triggering more than one CSI report within a CSI-ReportConfig reporting setting IE according to the third embodiment of the first set of embodiments. FIG. 6 is a schematic block diagram illustrating one embodiment of ASN.1 code 600 for triggering two CSI reports within a CodebookConfig codebook configuration IE according to the third embodiment of the first set of embodiments.

In a fourth embodiment of the first set of embodiments, a UE configured with multi-TRP transmission may be configured with one or more CSI reporting settings CSI-ReportConfig, wherein at least one of the one or more CSI reporting settings CSI-ReportConfig configures two CodebookConfig codebook configurations corresponding to one or more CSI reports. FIG. 7 is a schematic block diagram illustrating one embodiment of ASN.1 code 700 for triggering two CSI reports within a CSI-ReportConfig reporting setting IE according to the fourth embodiment of the first set of embodiments.

In a fifth embodiment of the first set of embodiments, a UE configured with multi-TRP transmission may be configured with one or more CSI reporting settings CSI-ReportConfig, wherein at least one of the one or more CSI reporting settings CSI-ReportConfig configures two report quantities (e.g., reportQuantity) corresponding to one or more CSI reports. FIG. 8 is a schematic block diagram illustrating one embodiment of ASN.1 code 800 for triggering two CSI reports within a CSI-ReportConfig reporting setting IE according to the fifth embodiment of the first set of embodiments.

In a sixth embodiment of the first set of embodiments, a UE configured with multi-TRP transmission may be configured with an IE for repetition scheme configuration (e.g., RepetitionSchemeConfig-r17) in at least one PDSCH configuration PDSCH-Config, wherein the repetition scheme configuration contains a higher-layer parameter for a repetition scheme (e.g., repetitionScheme-r17) that is set to a value that corresponds to multi-TRP transmission with overlapping time and/or frequency resources (e.g., the parameter repetitionScheme-r17 is set to 'sdmSchemeA'). FIG. 9 is a schematic block diagram illustrating one embodiment of ASN.1 code 900 for a RepetitionSchemeConfig repetition scheme configuration IE according to the sixth embodiment of the first set of embodiments.

In a seventh embodiment of the first set of embodiments, a UE configured with multi-TRP transmission may be indicated with two TCI states in a codepoint of a DCI field (e.g., transmission configuration indication) and demodulation ("DM") reference signal ("RS") ("DM-RS") ports within two code division multiplexing ("CDM") groups in a DCI field (e.g., antenna ports).

In a second set of embodiments, DCI may be carried by PDCCHs.

In certain embodiments, a UE receives two PDCCHs that schedule one or more PDSCHs, the two PDCCHs may carry DCI that correspond to the same or different DCI formats.

In a first embodiment of the second set of embodiments, both PDCCHs must carry a DCI of the same format. In one example, the two PDCCHs carry DCI of Format 1_1.

In a second embodiment of the second set of embodiments, a first of the two PDCCHs carry DCI in Format 1_1, whereas a second of the two PDCCHs carry DCI in Format 1_0.

In a third embodiment of the second set of embodiments, a first of the two PDCCHs carry DCI, wherein at least one of the following DCI fields (e.g., bandwidth part ("BWP") indicator, frequency-domain resource allocation, and time-domain resource allocation) are inferred from the corresponding DCI fields in a DCI carried by the second of two PDCCHs. In one example, the DCI fields in the first of the two DCI are set to a pre-determined value.

In a fourth embodiment of the second set of embodiments, at least one of the following DCI fields (e.g., BWP indicator, frequency-domain resource allocation, and time-domain resource allocation) are the same for two DCI carried by the two PDCCHs.

In a third set of embodiments, there may be a CSI framework for multi-DCI multi-TRP transmission with resource overlapping. In various embodiments, a set of DCI fields (e.g., {BWP indicator, frequency-domain resource allocation, time-domain resource allocation}) that may be present in DCI carried in a PDCCH that schedules PDSCH may infer the extent of resource overlap under multi-DCI based multi-TRP transmission. Based on the extent of the resource overlap, a UE may be configured with either single-TRP based CSI reporting or multi-TRP based CSI reporting. In such embodiments, the UE receives two PDCCHs that schedule one or more PDSCHs. Different embodiments that discuss the relationship between the resource overlapping and CSI reporting setting under multi-TRP transmission are found herein. A setup with a combination of one or more of the embodiments herein is not precluded.

In a first embodiment of the third set of embodiments, a UE with a first of the two PDCCHs carry DCI in Format 1_1, whereas a second of the two PDCCHs carry DCI in Format 1_0 and may be configured by default with one or more multi-TRP CSI reporting settings.

In a second embodiment of the third set of embodiments, a UE with at least one of the following DCI fields (e.g., BWP indicator, frequency-domain resource allocation, and time-domain resource allocation) are the same for two DCI carried by the two PDCCHs and may be configured by default with one or more multi-TRP CSI reporting settings.

In a third embodiment of the third set of embodiments, a UE that can be scheduled with fully overlapping PDSCHs in the time and frequency domain by multiple PDCCHs may trigger one or more multi-TRP CSI reporting settings.

In a fourth embodiment of the third set of embodiments, a UE that can be scheduled with partially overlapping PDSCHs in the time and frequency domain by multiple PDCCHs may trigger one or more multi-TRP CSI reporting settings.

In a fifth embodiment of the third set of embodiments, a UE may be scheduled with partially overlapping PDSCHs in the time and frequency domain by multiple PDCCHs, wherein the overlapping that meets a certain threshold may trigger one or more multi-TRP CSI reporting settings. In a first example, the threshold is based on a percentage of resources corresponding to the two PDSCHs that are common across both PDSCHs. In a second example, the threshold is based on a difference between resource identification numbers assigned to the two PDSCHs.

In a sixth embodiment of the third set of embodiments, a UE that can be scheduled with non-overlapping PDSCHs in the time and frequency domain by multiple PDCCHs is not expected to trigger a multi-TRP CSI reporting setting.

In various embodiments, there may be multiple CSI reporting settings under multi-DCI based multi-TRP transmission. In such embodiments, a UE that receives two PDCCHs that schedule one or more PDSCHs may be configured with multi-TRP based CSI reporting with one or more CSI reporting settings. Moreover, the UE may be configured with two CSI reporting settings. Different embodiments that discuss a relationship between resource overlapping and a CSI reporting setting under multi-TRP transmission are found herein. A setup with a combination of one or more embodiments herein is not precluded.

In a fourth set of embodiments, there may be a mapping of CSI reporting settings.

In a first embodiment of the fourth set of embodiments, a UE is configured with two CSI-Report config reporting settings, wherein each reporting setting corresponds to one of two PDCCHs that schedule one or more PDSCHs received by the UE.

In a second embodiment of the fourth set of embodiments, a UE is configured with two CSI-Report config reporting settings, wherein each reporting setting corresponds to one of two CORESETPoolIndex different values, wherein each CORESETPoolIndex corresponds to a ControlResourceSet CORESET associated with a PDSCH.

In a fifth set of embodiments, there may be CSI reporting configuration details. In such embodiments, there may be different alternatives related to the details of each of the two CSI reporting settings.

In a first embodiment of the fifth set of embodiments, each of the two CSI-ReportConfig reporting settings triggers up to two CSI reports, wherein each of the two CSI reports includes up to one PMI, up to one rank indicator ("RI"), and up to one channel quality indicator ("CQI"). Here, a first of the two CSI reports may correspond to single-TRP CSI reporting, whereas a second of the two CSI reports may correspond to multi-TRP (e.g., non-coherent joint transmission ("NCJT")) reporting In one example, each of the two CSI report includes one PMI, one RI, and one CQI.

In a second embodiment of the fifth set of embodiments, each of the two CSI-ReportConfig reporting settings triggers up to two CSI reports, wherein a first of the two CSI reports includes up to one PMI, up to one RI, and up to one CQI, and wherein a second of the two CSI reports includes up to one RI and up to one CQI. No PMI may be configured for the second of the two CSI reports. Here, a first of the two CSI reports may correspond to single-TRP CSI reporting, whereas a second of the two CSI reports may correspond to multi-TRP (e.g., NCJT) reporting. In one example, the first of the two CSI reports includes one PMI, one RI, and one CQI, and the second of the two CSI reports includes one RI and one CQI.

In a third embodiment of the fifth set of embodiments, each of the two CSI-ReportConfig reporting settings triggers up to two CSI reports, wherein a first of the two CSI reports includes up to one PMI, up to one RI, and up to one CQI, and wherein a second of the two CSI reports includes up to one CQI. Here, a first of the two CSI reports may correspond to single-TRP CSI reporting, whereas a second of the two CSI reports may correspond to multi-TRP (e.g., NCJT) reporting. Neither PMI nor RI may be configured for the second of the two CSI reports. In one example, the first of the two CSI reports includes one PMI, one RI, and one CQI, and the second of the two CSI reports includes one CQI.

In a fourth embodiment of the fifth set of embodiments, each of the two CSI-ReportConfig reporting settings triggers one CSI report, wherein the CSI report includes up to two PMI, up to two RI, and up to two CQI. Here, a first of the two PMI, RI, and/or CQI may correspond to single-TRP CSI reporting, whereas a second of the two PMI, RI, and/or CQI may correspond to multi-TRP (e.g., NCJT) reporting. In one example, the CSI report corresponding to a first of the two reporting settings includes two PMI, two RI, and two CQI, and the CSI report corresponding to a second of the two reporting settings includes two PMI, two RI, and one CQI.

In a fifth embodiment of the fifth set of embodiments, each of the two CSI-ReportConfig reporting settings triggers one CSI report, wherein the CSI report includes up to one PMI, up to two RI, and up to two CQI. Here, a first of the two RI and/or CQI may correspond to single-TRP CSI reporting, whereas a second of the two RI and/or CQI may correspond to multi-TRP (e.g., NCJT) reporting. In one example, the CSI report corresponding to a first of the two reporting settings includes one PMI, two RI, and two CQI, and the CSI report corresponding to a second of the two reporting settings includes one PMI, two RI, and one CQI.

In a sixth embodiment of the fifth set of embodiments, each of the two CSI-ReportConfig reporting settings triggers one CSI report, wherein the CSI report includes up to one PMI, up to one RI, and up to two CQI. Here, a first of the two CQI may correspond to single-TRP CSI reporting, whereas a second of the two CQI may correspond to multi-TRP (e.g., NCJT) reporting. In one example, the CSI report corresponding to a first of the two reporting settings includes one PMI, one RI, and two CQI, and the CSI report corresponding to a second of the two reporting settings includes one PMI, one RI, and one CQI.

In a sixth set of embodiments, there may be a single CSI reporting setting under multi-DCI based multi-TRP transmission. In such embodiments, a UE that receives two PDCCHs that schedule one or more PDSCHs may be configured with multi-TRP based CSI reporting with one or more CSI reporting settings. Moreover, the UE is configured with one CSI reporting setting, wherein the reporting settings maps to two PDCCHs, two PDSCHs, or two different values of CORESETPoolIndex corresponding to two ControlResourceSet CORE SETs. Here, we discuss different design alternatives of the CSI reporting setting under multi-TRP transmission. In general, the CSI-ReportConfig reporting setting configures multiple CSI reports corresponding to one or more codebook configurations (e.g., codebookConfig) and/or one or more CSI report quantities (e.g., reportQuantity). Different embodiments on the number of CSI reports, PMI, and RI per report are found herein.

In a first embodiment of the sixth set of embodiments, up to four CSI reports are triggered in one CSI-ReportConfig, where each CSI report contains no more than a single PMI, a single RI, and a single CQI. In one example, the first CSI report corresponds to single-TRP transmission from the first TRP, and the second CSI report corresponds to single-TRP transmission from the second TRP, whereas the third and the fourth CSI reports correspond to the first and second TRPs respectively under joint transmission with total rank of $RI^{(3)} + RI^{(4)}$, under multi-TRP transmission hypothesis, wherein $RI^{(k)}$ is an indicator of a rank corresponding to a $k^{th}$ CSI report. For the third and fourth CSI reports, the CQI values in the third and fourth CSI reports can be set to have the same values (e.g., $CQI^{(3)} = CQI^{(4)}$)), and wherein $CQI^{(k)}$ is an indicator of a channel quality corresponding to a $k^{th}$ CSI report. In some embodiments, CQI may not be reported in one of the third and fourth CSI reports, or may have a dummy value or CSI report (e.g., fourth CSI report) may include an indication indicating that the CQI (e.g., $CQI^{(4)}$ in fourth CSI report) is the same as that reported in another CSI another report (e.g., $CQI^{(3)}$ in third CSI report 3). If $RI^{(3)} + RI^{(4)} > 4$, two CQI values may be needed for joint transmission under multi-TRP, which may be reported in one of the third and fourth CSI reports, or the first of the two CQI values may be reported in the third CSI report, and the second of the two CQI values may be reported in the fourth CSI report. Also, if a total number of layers in the first or second CSI report is larger than 4, up to two CQI values may be reported in this CSI report. In such embodiments, one report quantity (e.g., reportQuantity) and one codebook configuration (e.g., codebookConfig) may be configured within a CSI-ReportConfig reporting setting.

In a second embodiment of the sixth set of embodiments, up to three CSI reports are triggered in one CSI-ReportConfig. In one example, the first CSI report corresponds to single-TRP transmission from the first TRP, and includes one (e.g., no more than one) PMI, one RI, and one CQI, and the second CSI report corresponds to single-TRP transmission from the second TRP, and includes one (e.g., no more than one) PMI, one RI, and one CQI, whereas the third CSI report corresponds to joint transmission under multi-TRP, and includes one RI, one CQI, and up to two PMI corresponding to the first and second TRPs respectively under joint transmission. In such embodiments, if a total number of layers in one CSI report is larger than 4, up to two CQI values may be reported in the CSI report. Moreover, in such embodiments, up to two report quantities (e.g., reportQuantity) and up to two codebook configurations (e.g., codebookConfig) may be configured within a CSI-ReportConfig reporting setting.

In a third embodiment of the sixth set of embodiments, up to three CSI reports are triggered in one CSI-ReportConfig. In one example, the first CSI report corresponds to single-TRP transmission from the first TRP, and includes one (e.g., no more than one) PMI, one RI, and one CQI, and the second CSI report corresponds to single-TRP transmission from the second TRP, and includes one (e.g., no more than one) PMI, one RI, and one CQI, whereas the third CSI report corresponds to joint transmission under multi-TRP, and includes one CQI, one PMI, and two RIs that represent the number of layers corresponding to the first and second TRPs respectively, where the PMI corresponds to a total number of layers equal to the summation of the values of the two RIs (e.g., $RI_1^{(3)} + RI_2^{(3)}$), and wherein $RI_j^{(k)}$ is an indicator of a rank corresponding to a $j^{th}$ PMI of a $k^{th}$ CSI report. In such embodiments, if a total number of layers in one CSI report is larger than 4, up to two CQI values may be reported in the CSI report. Moreover, in such embodiments, up to two report quantities (e.g., reportQuantity) and up to two codebook configurations (e.g., codebookConfig) may be configured within a CSI-ReportConfig reporting setting.

In a fourth embodiment of the sixth set of embodiments, up to three CSI reports are triggered in one CSI-ReportConfig. In one example, the first CSI report corresponds to single-TRP transmission from the first TRP, and includes one (e.g., no more than one) PMI, one RI, and one CQI, and the second CSI report corresponds to single-TRP transmission from the second TRP, and includes one (e.g., no more than one) PMI, one RI, and one CQI, whereas the third CSI report corresponds to joint transmission under multi-TRP, and includes one PMI, one CQI, one RI, and a one-bit indicator $\lambda$ that correspond to the first and second TRPs under joint transmission, where the distribution of layers corresponding to the first and second TRPs is parametrized by RI and $\lambda$ under multi-TRP transmission hypothesis. In one example, when $RI^{(3)}$ represents an odd-valued integer, reporting $\lambda = 0$ implies that the number of layers corresponding to the first and second TRPs are $\lfloor RI^{(3)}/2 \rfloor + 1$, $\lfloor RI^{(3)}/2 \rfloor$ layers, respectively, and reporting $\lambda = 1$ implies that the number of layers corresponding to the first and second TRPs are $\lfloor RI^{(3)}/2 \rfloor$, $\lfloor RI^{(3)}/2 \rfloor + 1$ layers, respectively, whereas the number of layers corresponding to the first and second TRPs when $RI^{(3)}$ represents an even-valued integer would be the same (e.g., $RI^{(3)}/2$ layers) for each TRP regardless of the value of the indicator $\lambda$. In such embodiments, if a total number of layers whose information are indicated in the PMI of a CSI report is larger than 4, up to two CQI values may be reported in the CSI report.

In a fifth embodiment of the sixth set of embodiments, up to three CSI reports are triggered in one CSI-ReportConfig. In one example, the first CSI report corresponds to single-TRP transmission from the first TRP, and includes one (e.g., no more than one) PMI, one RI, and one CQI, and the second CSI report corresponds to single-TRP transmission from the second TRP, and includes one (e.g., no more than one) PMI, one RI, and one CQI, whereas the third CSI report corresponds to joint transmission under multi-TRP, and includes one PMI, one CQI, and one RI that correspond to the first and second TRPs under joint transmission, where the distribution of layers corresponding to the first and second TRPs is set by a rule (e.g., the CSI for the first TRP comprises $\lceil RI^{(3)}/2 \rceil$ layers' information and the CSI for the second TRP comprises $\lfloor RI^{(3)}/2 \rfloor$ layers' information) under a multi-TRP transmission hypothesis. In such embodiments, if the total number of layers whose information are indicated in the PMI of a CSI report is larger than 4, up to two CQI values may be reported in the CSI report.

In a sixth embodiment of the sixth set of embodiments, up to three CSI reports are triggered in one CSI-ReportConfig. In one example, each of the first and second CSI reports correspond to single-TRP transmission from the first and second TRP respectively, and each includes one CQI and up to one RI, and the third CSI report corresponds to joint transmission under multi-TRP, and includes one CQI, up to two RI, and up to two PMI corresponding to the first and second TRPs under joint transmission, respectively. The first and second PMI in the third CSI report may be used for single-TRP transmission in conjunction with the first CSI report for single-TRP transmission under the first TRP and the second CSI report for single-TRP transmission under the second TRP, respectively. In certain embodiments, the first and second CSI reports may not include any RI whereas the third CSI report may include two RI (e.g., $RI_3^{(1)}$ and $RI_3^{(1)}$) for the number of layers across $PMI_1^{(3)}$ and $PMI_2^{(3)}$, respectively, and wherein $PMI_j^{(k)}$ is an indicator of a $j^{th}$ precoding matrix of a $k^{th}$ CSI report. In some embodiments, the first and second CSI reports may not include an RI, whereas the third CSI report may include one RI (e.g., RI(3)) corresponding to the sum of layers across $PMI_1^{(3)}$ and $PMI_2^{(3)}$, respectively. In various embodiments, if the total number of layers whose information are indicated in the PMI of a CSI report is larger than 4, up to two CQI values may be reported in the CSI report.

In a seventh embodiment of the sixth set of embodiments, up to three CSI reports are triggered in one CSI-ReportConfig. In one example, each of the first and second CSI reports correspond to single-TRP transmission from the first and second TRP respectively, and each includes one CQI, one RI, one PMI, and the third CSI report corresponds to joint transmission under multi-TRP, and includes one CQI, and up to one RI. It should be noted that the PMI in the first and second CSI reports may be combined to obtain CSI for joint transmission between the first and second TRP, respectively, for multi-TRP transmission, and the RI in the third report may be the summation of the RI in the first two CSI reports (e.g., $RI^{(3)}=RT^{(1)}+RT^{(2)}$). In various embodiments, the third CSI report may not include any RI whereas the number of layers for multi-TRP transmission may be inferred from $RI^{(1)}$ and $RI^{(2)}$. It should be noted that if the total number of layers whose information are indicated in the PMI of a CSI report is larger than 4, up to two CQI values may be reported in the CSI report.

In an eight embodiment of the sixth set of embodiments, up to two CSI reports are triggered in one CSI-ReportConfig, where each CSI report contains up to two PMI, up to two RI, and up to two CQI. In one example, the first CSI report corresponds to the first TRP, wherein the first PMI, RI, and CQI correspond to single-TRP transmission from the first TRP, and the second PMI, RI, CQI correspond to CSI for the first TRP under joint transmission in multi-TRP mode, whereas the second CSI report corresponds to the second TRP, wherein the first PMI, RI, and CQI correspond to single-TRP transmission from the second TRP, and the second PMI, RI, CQI correspond to CSI for the second TRP under joint transmission in multi-TRP mode. It should be noted that the total rank reported for multi-TRP transmission may be the sum of the second RIs in the first and second CSI reports, respectively (e.g., $RI_2^{(1)}+RI_2^{(2)}$). The second CQI values in the first and second CSI reports may be set to have the same values (e.g., $CQI_2^{(1)}=CQI_2^{(2)}$). In various embodiments, a second CQI may not be reported in one of the first and second CSI reports, or may have a dummy value. If $RI_2^{(1)}+RI_2^{(2)}>4$, two CQI values may be needed for joint transmission under multi-TRP, which may be reported in one of the first and second CSI reports, or the first of the two CQI values may be reported in the first CSI report, and the second of the two CQI values may be reported in the second CSI report. Also, if the first RI in the first or second CSI report is larger than 4, an additional CQI value may be reported in this CSI report corresponding to single-TRP transmission. In such embodiments, one report quantity (e.g., reportQuantity) and one codebook configuration (e.g., codebookConfig) may be configured within a CSI-ReportConfig reporting setting.

In a ninth embodiment of the sixth set of embodiments, up to two CSI reports are triggered in one CSI-ReportConfig, where the first of two CSI reports contains a single PMI, a single RI, and a single CQI, and the second of two CSI reports contains up to two PMI, up to two RI, and one CQI. In one example, the first CSI report corresponds to single-TRP transmission from either the first or second TRP, and the second CSI report includes one RI, one CQI, and two PMI corresponding to joint transmission from the first and second TRPs, respectively. In another example, the first CSI report corresponds to single-TRP transmission from either the first or second TRP, and the second CSI report includes one CQI and two PMI and/or RI corresponding to joint transmission from the first and second TRPs, respectively. In a third example, the first CSI report corresponds to single-TRP transmission from either the first or second TRP, and the second CSI report includes one CQI, one PMI, one RI and an additional one-bit indicator λ corresponding to joint transmission from the first and second TRPs, respectively, where λ is defined previously. It should be noted that if the total number of layers whose information are indicated in either CSI report is larger than 4, up to two CQI values may be reported in the CSI report. In some of the examples, the first CSI report may include an indication of whether the first CSI report corresponds to either the first or second TRP.

In the sixth set of embodiments, one or more of each of the CSI reference signal ("RS") ("CSI-RS") resource index ("CRI"), synchronization signal ("SS") and/or physical broadcast channel ("PBCH") ("SS/PBCH") block resource index ("SSBRI"), layer index ("LI"), L1 RSRP ("L1-RSRP"), and L1 signal-to-interference-and-noise-ratio ("SINR") ("L1-SINR") may be reported. If RI>4, more than one CQI value may be reported for one or more hypotheses (e.g., 2 CQI values reported for multi-TRP transmission hypothesis).

In a seventh set of embodiments, there may be CQI reporting. Multiple CQI values may be reported in one CSI report, or across multiple CSI reports triggered with the same CSI-ReportConfig. Different embodiments of CQI feedback are provided herein. A setup with a combination of one or more embodiments herein is not precluded.

In a first embodiment of the seventh set of embodiments, a number of CQI ("$N_{CQI}$") reported in one or more CSI reports triggered by the same CSI-ReportConfig is proportional to the number of PMI ("$N_{PMI}$") (e.g., $N_{PMI}=N_{CQI}$) on the condition that this PMI includes no more than 4 layers, otherwise it would correspond to 2 CQI values. In one example, if 2 PMI are reported, where one PMI includes information for 3 layers and the second PMI including information for 6 layers, 3 CQI values are reported (e.g., one corresponding to the first PMI and two corresponding to the last PMI).

In a second embodiment of the seventh set of embodiments, whenever more than one CQI is reported in one CSI report, the first CQI is reported in CSI Part 1, whereas all other subsequent CQI are reported in CSI Part 2.

In a third embodiment of the seventh set of embodiments, whenever more than one CQI is reported, the CQI subsequent to the first CQI are computed in a differential manner with respect to CSI Part 1 (e.g., $CQI_1=CQI_{1,Reported}$ and $CQI_2=CQI_{1,Reported}+CQI_{2,Reported}$, where $CQI_{1,Reported}$, $CQI_{2,Reported}$ represent the reported CQI index value in the CSI report, and $CQI_1$, $CQI_2$, represent the CQI index values adjusted by the network). The aforementioned CQI values may correspond to a either a wideband CQI index, a sub-band CQI index, or both.

In a fourth embodiment of the seventh set of embodiments, the cqi-FormatIndicator CQI format indicator is always set to 'widebandCQI', whenever multiple CSI reports or multiple PMI are triggered.

In a fifth embodiment of the seventh set of embodiments, only one cqi-FormatIndicator CQI format indicator is configured in a CSI-ReportConfig reporting setting for a subset of the CQI values triggered per reporting setting, whereas the remainder of the CQI values are always reported in wideband format.

In a sixth embodiment of the seventh set of embodiments, multiple CQI format indicators are triggered in the same CSI-ReportConfig reporting setting corresponding to different CQI values reported. In one example, the first CQI format indicator cqi-FormatIndicator represents one CQI and the second CQI format indicator cqi-FormatIndicator1 represents subsequent CQI values. FIG. 10 is a schematic block diagram illustrating one embodiment of ASN.1 code 1000 for triggering multiple CQI values within a CSI- ReportConfig reporting setting IE according to the sixth embodiment of the sixth set of embodiments.

In an eight set of embodiments, there may be an indication of a primary TRP. CSI feedback for one or more channel hypotheses corresponding to different transmission modes may be supported in one CSI report for multi-TRP transmission. Different embodiments of how the CSI for different hypotheses are multiplexed across one or more CSI reports are provided herein. A setup with a combination of one or more embodiments found herein is not precluded.

In a first embodiment of the eight set of embodiments, a CSI report corresponding to a single-TRP transmission hypothesis has higher priority compared with a CSI report corresponding to multi-TRP transmission. In one example, a CSI report corresponding to multi-TRP hypothesis includes multiple PMI in the CSI report for rank that is no larger than 4.

In a second embodiment of the eight set of embodiments, PMI corresponding to channel hypotheses with higher CQI are multiplexed, encoded, and/or listed before PMI corresponding to channel hypotheses with relatively lower CQI value. In one example, a single-TRP CSI has a higher wideband CQI compared with multi-TRP CSI. The PMI corresponding to single-TRP hypothesis may be multiplexed, encoded, and/or listed before PMI corresponding to multi-TRP hypothesis.

In a third embodiment of the eight set of embodiments, an indicator is reported in one or more CSI reports, which identifies the order in which the CSI is multiplexed. In one example, a one-bit indicator (e.g., $\delta$) is included in a CSI report. When $\delta=0$, the PMI corresponding to multi-TRP hypothesis is multiplexed, encoded, and/or listed before the PMI corresponding to single-TRP hypothesis, whereas if $\delta=1$, the PMI corresponding to multi-TRP hypothesis is multiplexed, encoded, and/or listed after the PMI corresponding to single-TRP hypothesis.

In a fourth embodiment of the eight set of embodiments, an indicator is reported in one or more CSI reports, which identifies the channel hypothesis for which CSI is reported. In one example, a one-bit indicator (e.g., $\delta$) is included in a CSI report. If $\delta=0$, the PMI corresponding to single-TRP hypothesis from the first TRP is reported, whereas when $\delta=1$ the PMI corresponding to single-TRP hypothesis from the second TRP is reported. In another example, if $\delta=0$, the PMI corresponding to single-TRP hypothesis is reported, whereas if $\delta=1$ the PMI corresponding to multi-TRP hypothesis is reported.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

FIG. 11 is a flow chart diagram illustrating one embodiment of a method 1100 for configuring a channel state information report. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, at a user equipment, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the method 1100 includes receiving 1104 at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the method 1100 includes receiving 1106 a CSI reference signal transmitted from the two network nodes based on the at least one CSI reporting configuration. In various embodiments, the method 1100 includes transmitting 1108 a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof.

In some embodiments, each DCI sequence of the two DCI sequences schedules a distinct PDSCH. In various embodiments, each DCI sequence of the two DCI sequences has a same format. In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof. In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof. In various embodiments, two CSI reporting configurations are configured for the two network nodes.

In one embodiment, resources allocated to a first PDSCH transmission scheduled by the first DCI sequence overlap with resources allocated for a second PDSCH transmission scheduled by the second DCI sequence in time, frequency, or a combination thereof. In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH. In various embodiments, the method 1100 further comprises transmitting two CSI reports corresponding to the two CSI reporting configurations, wherein each CSI reporting configuration of the two CSI reporting configurations includes up to two precoder matrix indicators (PMIs) and up to two channel quality indicators (CQIs). In one embodiment, an additional indicator is reported to indicate a PMI of the two PMIs having a higher priority.

FIG. 12 is a flow chart diagram illustrating another embodiment of a method 1200 for configuring a channel state information report. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes transmitting 1202, from at least one network unit, two downlink control information (DCI) sequences over a physical downlink control channel (PDCCH). The two DCI sequences schedule at least one physical downlink shared channel (PDSCH) corresponding to joint transmission from two network nodes. Information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs. In some embodiments, the method 1200 includes transmitting 1204 at least one channel state information (CSI) reporting configuration. A first CSI report configuration of the at least one CSI reporting configuration corresponds to the first DCI sequence of the two DCI sequences and is inferred from a second CSI reporting configuration of the at least one CSI report configuration. The second CSI reporting configuration corresponds to the second DCI sequence of the two DCI sequences. In certain embodiments, the method 1200 includes transmitting 1206 a CSI reference signal transmitted from the two network nodes based on the at least one CSI reporting configuration. In various embodiments, the method 1200 includes receiving 1208 a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof. In some embodiments, each DCI sequence of the two DCI sequences schedules a distinct PDSCH. In various embodiments, each DCI sequence of the two DCI sequences has a same format.

In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2. In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof.

In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof. In various embodiments, two CSI reporting configurations are configured for the two network nodes. In one embodiment, resources allocated to a first PDSCH transmission scheduled by the first DCI sequence overlap with resources allocated for a second PDSCH transmission scheduled by the second DCI sequence in time, frequency, or a combination thereof.

In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH. In various embodiments, the method 1200 further comprises receiving two CSI reports corresponding to the two CSI reporting configurations, wherein each CSI reporting configuration of the two CSI reporting configurations includes up to two precoder matrix indicators (PMIs) and up to two channel quality indicators (CQIs). In one embodiment, an additional indicator is reported to indicate a PMI of the two PMIs having a higher priority.

In one embodiment, an apparatus comprises a user equipment. The apparatus further comprises: a receiver that: receives two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; receives at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and receives a CSI reference signal transmitted from the two network nodes based on the at least one CSI reporting configuration; and a transmitter that transmits a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof.

In some embodiments, each DCI sequence of the two DCI sequences schedules a distinct PDSCH.

In various embodiments, each DCI sequence of the two DCI sequences has a same format.

In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof.

In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof.

In various embodiments, two CSI reporting configurations are configured for the two network nodes.

In one embodiment, resources allocated to a first PDSCH transmission scheduled by the first DCI sequence overlap with resources allocated for a second PDSCH transmission scheduled by the second DCI sequence in time, frequency, or a combination thereof.

In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH.

In various embodiments, the transmitter transmits two CSI reports corresponding to the two CSI reporting configurations, and each CSI reporting configuration of the two CSI reporting configurations includes up to two precoder matrix indicators (PMIs) and up to two channel quality indicators (CQIs).

In one embodiment, an additional indicator is reported to indicate a PMI of the two PMIs having a higher priority.

In one embodiment, a method of a user equipment comprises: receiving two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; receiving at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; receiving a CSI reference signal transmitted from the two network nodes based on the at least one CSI reporting configuration; and transmitting a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof.

In some embodiments, each DCI sequence of the two DCI sequences schedules a distinct PDSCH.

In various embodiments, each DCI sequence of the two DCI sequences has a same format.

In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof.

In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof.

In various embodiments, two CSI reporting configurations are configured for the two network nodes.

In one embodiment, resources allocated to a first PDSCH transmission scheduled by the first DCI sequence overlap with resources allocated for a second PDSCH transmission scheduled by the second DCI sequence in time, frequency, or a combination thereof.

In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH.

In various embodiments, the method further comprises transmitting two CSI reports corresponding to the two CSI reporting configurations, wherein each CSI reporting configuration of the two CSI reporting configurations includes up to two precoder matrix indicators (PMIs) and up to two channel quality indicators (CQIs).

In one embodiment, an additional indicator is reported to indicate a PMI of the two PMIs having a higher priority.

In one embodiment, an apparatus comprises at least one network unit. The apparatus further comprises: a transmitter that: transmits two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; transmits at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and transmits a CSI reference signal transmitted from the two network nodes based on the at least one CSI reporting configuration; and a receiver that receives a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof.

In some embodiments, each DCI sequence of the two DCI sequences schedules a distinct PDSCH.

In various embodiments, each DCI sequence of the two DCI sequences has a same format.

In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof.

In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof.

In various embodiments, two CSI reporting configurations are configured for the two network nodes.

In one embodiment, resources allocated to a first PDSCH transmission scheduled by the first DCI sequence overlap with resources allocated for a second PDSCH transmission scheduled by the second DCI sequence in time, frequency, or a combination thereof.

In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH.

In various embodiments, the receiver receives two CSI reports corresponding to the two CSI reporting configurations, and each CSI reporting configuration of the two CSI reporting configurations includes up to two precoder matrix indicators (PMIs) and up to two channel quality indicators (CQIs).

In one embodiment, an additional indicator is reported to indicate a PMI of the two PMIs having a higher priority.

In one embodiment, a method of at least one network unit comprises: transmitting two downlink control information (DCI) sequences over a physical downlink control channel (PDCCH), wherein the two DCI sequences schedule at least one physical downlink shared channel (PDSCH) corresponding to joint transmission from two network nodes, wherein information for a first PDSCH of the at least one PDSCH corresponding to a first DCI sequence of the two DCI sequences is inferred from DCI fields corresponding to a second DCI sequence of the two DCI sequences, and each DCI sequence of the two DCI sequences is received over one PDCCH of a set of two PDCCHs; transmitting at least one channel state information (CSI) reporting configuration, wherein a first CSI report configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; transmitting a CSI reference signal transmitted from the two network nodes based on the at least one CSI reporting configuration; and receiving a CSI report based on the least one CSI reporting configuration and the CSI reference signal.

In certain embodiments, the joint transmission from the two network nodes is indicated via: control resource sets (CORESETs) corresponding to the two DCI sequences having different values of a CORESET pool index parameter; a higher-layer parameter for multiple transmission and reception points (multi-TRPs) in the at least one CSI reporting configuration; an indication of multiple CSI reports per CSI reporting configuration of at least one CSI reporting configuration; two codebook configurations being configured in the at least one CSI reporting configuration; two report quantities being configured in the at least one CSI reporting configuration; a received transmission configuration indicator (TCI) codepoint corresponding to two TCI states; antenna ports fields in the two DCI sequences corresponding to two code division multiplexing (CDM) groups; or some combination thereof.

In some embodiments, each DCI sequence of the two DCI sequences schedules a distinct PDSCH.

In various embodiments, each DCI sequence of the two DCI sequences has a same format.

In one embodiment, the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

In certain embodiments, a first PDCCH of the set of two PDCCHs carries the first DCI sequence, at least one field of a set of DCI fields is inferred from corresponding DCI fields in the second DCI sequence carried by the second PDCCH of the set of two PDCCHs, and the set of DCI fields comprises a bandwidth part (BWP) indicator, a frequency-domain resource allocation, a time-domain resource allocation, or some combination thereof.

In some embodiments, at least one field of a set of DCI fields is the same for the first DCI sequence and the second DCI sequence, and the set of DCI fields comprises a bandwidth part (BWP) indicator, a frequency-domain resource allocation, a time-domain resource allocation, or some combination thereof.

In various embodiments, two CSI reporting configurations are configured for the two network nodes.

In one embodiment, resources allocated to a first PDSCH transmission scheduled by the first DCI sequence overlap with resources allocated for a second PDSCH transmission scheduled by the second DCI sequence in time, frequency, or a combination thereof.

In certain embodiments, a first CSI reporting configuration of the two CSI reporting configurations is associated with the first DCI sequence for a TCI state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

In some embodiments, one CSI reporting configuration is associated with each CORESET pool index, and each CORESET pool index corresponds to a control resource set associated with a PDSCH.

In various embodiments, the method further comprises receiving two CSI reports corresponding to the two CSI reporting configurations, wherein each CSI reporting configuration of the two CSI reporting configurations includes up to two precoder matrix indicators (PMIs) and up to two channel quality indicators (CQIs).

In one embodiment, an additional indicator is reported to indicate a PMI of the two PMIs having a higher priority.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive two downlink control information (DCI) sequences over a physical downlink control channel (PDCCH), wherein the two DCI sequences schedule a physical downlink shared channel (PDSCH) corresponding to joint transmission from two network nodes, wherein information for at least one DCI field of the PDSCH is inferred from one or more DCI fields, and wherein the at least one DCI field corresponds to a first DCI sequence of the two DCI sequences and the one or more DCI fields correspond to a second DCI sequence of the two DCI sequences, and each DCI sequence of the two DCI sequences is received over one PDCCH of a set of two PDCCHs;

receive at least one channel state information (CSI) reporting configuration, wherein a first CSI reporting configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences;

receive a CSI reference signal transmitted from the two network nodes based on the at least one CSI reporting configuration; and transmit a CSI report based on the at least one CSI reporting configuration and the CSI reference signal.

2. The UE of claim 1, wherein the joint transmission from the two network nodes is indicated via:

control resource sets (CORESETs) corresponding to the two DCI sequences having different values of a CORESET pool index parameter;

a higher-layer parameter for multiple transmission and reception points (multi-TRPs) in the at least one CSI reporting configuration;

an indication of multiple CSI reports per CSI reporting configuration of at least one CSI reporting configuration;

two codebook configurations being configured in the at least one CSI reporting configuration;

two report quantities being configured in the at least one CSI reporting configuration;

a received transmission configuration indicator (TCI) codepoint corresponding to two TCI states;

antenna ports fields in the two DCI sequences corresponding to two code division multiplexing (CDM) groups; or a combination thereof.

3. The UE of claim 1, wherein each DCI sequence of the two DCI sequences schedules a distinct PDSCH.

4. The UE of claim 1, wherein each DCI sequence of the two DCI sequences has a same format.

5. The UE of claim 1, wherein the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

6. The UE of claim 1, wherein a first PDCCH of the set of two PDCCHs carries the first DCI sequence, at least one field of a set of DCI fields is inferred from corresponding DCI fields in the second DCI sequence carried by a second PDCCH of the set of two PDCCHs, and the set of DCI fields comprises a bandwidth part (BWP) indicator, a frequency-domain resource allocation, a time-domain resource allocation, or a combination thereof.

7. The UE of claim 1, wherein at least one field of a set of DCI fields is the same for the first DCI sequence and the second DCI sequence, and the set of DCI fields comprises a bandwidth part (BWP) indicator, a frequency-domain resource allocation, a time-domain resource allocation, or a combination thereof.

8. The UE of claim 1, wherein two CSI reporting configurations are configured for the two network nodes.

9. The UE of claim 8, wherein resources allocated to a first PDSCH transmission scheduled by the first DCI sequence overlap with resources allocated for a second PDSCH transmission scheduled by the second DCI sequence in time, frequency, or a combination thereof.

10. The UE of claim 8, wherein a first CSI reporting configuration of the two CSI reporting configurations is associated with the first DCI sequence for a transmission configuration indicator (TCI) state comprising a first CSI reference signal (RS) (CSI-RS) resource that is associated with channel measurement and reporting in the first CSI reporting configuration, and a second CSI reporting configuration of the two CSI reporting configurations is associated with the second DCI sequence for a TCI state comprising a second CSI-RS resource that is associated with channel measurement and reporting in the second CSI reporting configuration.

11. The UE of claim 8, wherein one CSI reporting configuration is associated with each control resource sets (CORESET) pool index, and each CORESET pool index corresponds to a control resource set associated with a PDSCH.

12. The UE of claim 8, wherein the at least one processor is configured to cause the UE to transmit two CSI reports corresponding to the two CSI reporting configurations, and each CSI reporting configuration of the two CSI reporting configurations includes up to two precoder matrix indicators (PMIs) and up to two channel quality indicators (CQIs).

13. The UE of claim 12, wherein an additional indicator is reported to indicate a PMI of the two PMIs having a higher priority.

14. A method performed by a user equipment (UE), the method comprising:

receiving two downlink control information (DCI) sequences over a physical downlink control channel (PDCCH), wherein the two DCI sequences schedule a physical downlink shared channel (PDSCH) corresponding to joint transmission from two network nodes, wherein information for at least one DCI field of the PDSCH is inferred from one or more DCI fields, and wherein the at least one DCI field corresponds to a first DCI sequence of the two DCI sequences and the one or more DCI fields correspond to a second DCI sequence of the two DCI sequences, and each DCI sequence of the two DCI sequences is received over one PDCCH of a set of two PDCCHs;

receiving at least one channel state information (CSI) reporting configuration, wherein a first CSI reporting configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences;

receiving a CSI reference signal transmitted from the two network nodes based on the at least one CSI reporting configuration; and transmitting a CSI report based on the at least one CSI reporting configuration and the CSI reference signal.

15. An apparatus for performing a network function, the apparatus comprising:

at least one memory; and at least one processor coupled with the at least one memory and configured to cause the apparatus to:

transmit two downlink control information (DCI) sequences over a physical downlink control channel (PDCCH), wherein the two DCI sequences schedule a physical downlink shared channel (PDSCH) corresponding to joint transmission from two network nodes, wherein information for at least one DCI field of the PDSCH is inferred from one or more DCI fields, and wherein the at least one DCI field corresponds to a first DCI sequence of the two DCI sequences and the one or more DCI fields correspond to a second DCI sequence of the two DCI sequences, and each DCI sequence of the two DCI sequences is received over one PDCCH of a set of two PDCCHs;

transmit at least one channel state information (CSI) reporting configuration, wherein a first CSI reporting configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences; and transmit a CSI reference signal transmitted from the two network nodes based on the at least one CSI reporting configuration; and receive a CSI report based on the least one CSI reporting configuration and the CSI reference signal.

16. A processor for wireless communication, comprising:

at least one controller coupled with at least one memory and configured to cause the processor to:

receive two downlink control information (DCI) sequences over a physical downlink control channel (PDCCH), wherein the two DCI sequences schedule a physical downlink shared channel (PDSCH) corresponding to joint transmission from two network nodes, wherein information for at least one DCI field of the PDSCH is inferred from one or more DCI fields, and wherein the at least one DCI field corresponds to a first DCI sequence of the two DCI sequences and the one or more DCI fields correspond to a second DCI sequence of the two DCI sequences, and each DCI sequence of the two DCI sequences is received over one PDCCH of a set of two PDCCHs;

receive at least one channel state information (CSI) reporting configuration, wherein a first CSI reporting configuration of the at least one CSI reporting configuration corresponds to the first DCI sequence of the two DCI sequences and is inferred from a second CSI reporting configuration of the at least one CSI report configuration, and wherein the second CSI reporting configuration corresponds to the second DCI sequence of the two DCI sequences;

receive a CSI reference signal transmitted from the two network nodes based on the at least one CSI reporting configuration; and transmit a CSI report based on the at least one CSI reporting configuration and the CSI reference signal.

17. The processor of claim 16, wherein the joint transmission from the two network nodes is indicated via:

control resource sets (CORESETs) corresponding to the two DCI sequences having different values of a CORESET pool index parameter;

a higher-layer parameter for multiple transmission and reception points (multi-TRPs) in the at least one CSI reporting configuration;

an indication of multiple CSI reports per CSI reporting configuration of at least one CSI reporting configuration;

two codebook configurations being configured in the at least one CSI reporting configuration;

two report quantities being configured in the at least one CSI reporting configuration;

a received transmission configuration indicator (TCI) codepoint corresponding to two TCI states;

antenna ports fields in the two DCI sequences corresponding to two code division multiplexing (CDM) groups;

or a combination thereof.

18. The processor of claim 16, wherein each DCI sequence of the two DCI sequences schedules a distinct PDSCH.

19. The processor of claim 16, wherein each DCI sequence of the two DCI sequences has a same format.

20. The processor of claim 16, wherein the first DCI sequence of the two DCI sequences comprises one of a DCI Format 1_1 or a DCI Format 1_2, the second DCI sequence of the two DCI sequences comprises a DCI Format 1_0, and a subset of values in DCI Format 1_0 are inferred for PDSCH scheduled by one of DCI Format 1_1 or DCI Format 1_2.

* * * * *